(12) United States Patent
Prommate et al.

(10) Patent No.: US 6,273,409 B1
(45) Date of Patent: Aug. 14, 2001

(54) LOCKING SCREW MECHANISM THAT REQUIRES MINIMIZED LOOSENING FORCE

(75) Inventors: Wanus Prommate, Bangdua; Montri Treerawat, Pathumtani, both of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/479,560

(22) Filed: Jan. 7, 2000

(51) Int. Cl.⁷ ........................................................ B25B 1/10
(52) U.S. Cl. ............................................. 269/243; 269/903
(58) Field of Search .................................... 411/432, 533, 411/534; 269/240, 243, 285, 903

(56) References Cited

U.S. PATENT DOCUMENTS 2,128,844 * 8/1938 Myer et al. ............................ 411/534

* cited by examiner

Primary Examiner—Robert C. Watson
(74) Attorney, Agent, or Firm—Monica H. Choi

(57) ABSTRACT

A locking screw mechanism includes an improved screw nut for minimizing the force required for loosening the locking screw mechanism when an object is clamped therein. A locking screw mechanism includes a screw head disposed on a screw shaft and a screw nut threaded about the screw shaft. The screw nut includes a back screw nut threaded about the screw shaft. The back screw nut has a nut holding portion and a contact ring surface. The screw nut also includes a front screw nut disposed around the nut holding portion of the back screw nut. The front screw nut is disposed toward the object that is being clamped. The screw nut further includes a holding ring disposed around the nut holding portion of the back screw nut for holding the front screw nut to the back screw nut. The contact ring surface of the back screw nut turns against the front screw nut to press the front screw nut against the object when the back screw nut is threaded toward the object. In addition, the front screw nut is stationary, and the contact ring surface of the back screw nut turns against the front screw nut when the back screw nut is dethreaded away from the object to loosen the screw nut from the clamped object. The contact ring surface has a smaller area than the portion of the front screw nut that contacts the clamped object to minimize frictional force from the contact ring surface turning against the front screw nut such that a force required for dethreading the back screw nut away from the clamped object is minimized.

7 Claims, 4 Drawing Sheets

LOCKING SCREW MECHANISM THAT REQUIRES MINIMIZED LOOSENING FORCE

TECHNICAL FIELD

The present invention relates generally to screw mechanisms, and more particularly, to a locking screw mechanism with a screw nut having a front screw nut and a back screw nut for minimizing the force required for loosening the locking screw mechanism.

BACKGROUND OF THE INVENTION

The locking screw mechanism of the present invention is described for locking a magazine that holds strips of integrated circuit packages in a solder plating machine during manufacture of integrated circuit packages. However, the locking screw mechanism of the present invention may advantageously be used for locking any other object in place, as would be apparent to one of ordinary skill in the art from the present description herein.

Referring to FIG. 1, a magazine 12 is locked into place in a solder plating machine during manufacture of integrated circuit packages by four locking screw mechanisms including a first locking screw mechanism 14, a second locking screw mechanism 16, a third locking screw mechanism 18, and a fourth locking screw mechanism 20. The magazine 12 holds a first strip 22, a second strip 24, and a third strip 26 with each of the strips 22, 24, and 26 comprising a plurality of integrated circuit packages. For example, the first strip 22 is comprised of a first integrated circuit package 102, a second integrated circuit package 104, and a third integrated circuit package 106. A magazine typically includes more than three strips. For example, the magazine 12 typically holds eighty strips stacked within the magazine 12. However, the magazine 12 of FIG. 1 includes the three strips 22, 24, and 26 for clarity of illustration.

Each of the strips 22, 24, and 26 is comprised of a plurality of integrated circuit packages during manufacture of the integrated circuit packages. FIG. 1 shows a side view of the strips 22, 24, and 26 stacked within the magazine 12. Referring to FIG. 2 for example, a top view of the first strip 22 shows a top view of the first integrated circuit package 102, the second integrated circuit package 104, and the third integrated circuit package 106. A strip typically includes more than three integrated circuit packages, but the strips 22, 24, and 26 of FIGS. 1 and 2 include three integrated circuit packages for clarity of illustration.

Each of the integrated circuit packages on a strip has a plurality of leads. Referring to FIG. 3 for example, the first integrated circuit package 102 includes a first lead 112, a second lead 114, a third lead 116, and a fourth lead 118 on one side of the integrated circuit package 102. The first integrated circuit package 102 also includes a fifth lead 120, a sixth lead 122, a seventh lead 124, and an eighth lead 126 on the other side of the integrated circuit package 102. An integrated circuit package typically includes more than eight leads, but the integrated circuit packages 102, 104, and 106 of FIGS. 2 and 3 include eight leads for clarity of illustration.

Referring to FIG. 1, the strips 22, 24, and 26 of integrated circuit packages are stacked within the magazine 12, and the magazine 12 is clamped to a solder plating machine by the locking screw mechanisms 14, 16, 18, and 20 to plate the leads of the integrated circuit packages with solder which typically is comprised of tin (Sn) and lead (Pb). Referring to FIG. 4, a side view of one of the locking screw mechanisms 14, 16, 18, and 20 of the prior art illustrates a screw head 150 and a screw nut 152 that clamp the magazine 12 in place in the solder plating machine. (Elements having the same reference number in FIGS. 1 and 4 refer to elements having similar structure and function.) Referring to FIGS. 1 and 4, the magazine 12 is placed between the screw head 150 and the screw nut 152.

The screw nut 152 is then threaded about a screw shaft 154 to move the screw nut 152 toward the magazine 12 (in accordance with the right hand rule as known to one of ordinary skill in the art of mechanics). Referring to FIGS. 4 and 5, the screw nut 152 is threaded about the screw shaft 154 toward the magazine 12 until the screw nut 152 contacts and presses the magazine 12 against the screw head 150 such that the magazine 12 is firmly held between the screw head 150 and the screw nut 152. (Elements having the same reference number in FIGS. 1, 4, and 5 refer to elements having similar structure and function.)

Referring to FIG. 5, the screw head 150 has a first contact surface 156 and the screw nut 152 has a second contact surface 158. Referring to FIGS. 1 and 5, when the magazine 12 is clamped between the screw head 150 and the screw nut 152, the magazine 12 makes contact with a portion of the first contact surface 156 of the screw head 150 and with a portion of the second contact surface 158 of the screw nut 152. For example, FIG. 6 illustrates the second contact surface 158 of the screw nut 152 that surrounds the screw shaft 154. The portion of the second contact surface 158 of the screw nut 152 that makes contact with the magazine 12 (when the magazine is clamped between the screw head 150 and the screw nut 152) is shown as the shaded contact area 160. (Elements having the same reference number in FIGS. 1, 4, 5, and 6 refer to elements having similar structure and function.)

Referring to FIG. 1, the magazine 12 holding a plurality of strips 22, 24, and 26 of integrated circuit packages is clamped to a solder plating machine by the plurality of locking screw mechanisms 14, 16, 18, and 20 for plating the leads of the plurality of integrated circuit packages with solder during manufacture of the integrated circuit packages. After this solder plating process, the magazine 12 is released from the solder plating machine by loosening the plurality of locking screw mechanisms 14, 16, 18, and 20. The magazine 12 holding the plurality of strips 22, 24, and 26 of integrated circuit packages is then transferred to another station for further processing of the integrated circuit packages in the manufacture of the integrated circuit packages.

Referring to FIG. 5, for loosening the locking screw mechanism, the screw nut 152 is dethreaded about the screw shaft 154 away from the magazine 12 (in accordance with the right hand rule as known to one of ordinary skill in the art of mechanics). The force required to turn the screw nut 152 for initially dethreading the screw nut 152 away from the magazine 12 (while the magazine 12 is clamped between the screw head 150 and the screw nut 152) is determined predominantly by two counter-forces. A first counter-force is the frictional force between the threading of the screw shaft 154 and the threading within the screw nut 152.

Referring to FIG. 6, a second counter-force is the fictional force in the contact area 160 between the screw nut 152 and the magazine 12. When the magazine 12 is clamped between the screw head 150 and the screw nut 152, the screw nut 152 is pressed against the magazine 12 at the contact area 160. When the screw nut 152 is initially loosened, the screw nut 152 turns against the magazine at the contact area 160 with a frictional force as the screw nut 152 is turned during the dethreading of the screw nut 152 about the screw shaft 154.

The force required for loosening the screw nut 152 must overcome the above described frictional counter forces. In the prior art locking screw mechanism of FIGS. 4, 5, and 6, such a force required for loosening the screw nut 152 when the magazine 12 is clamped between the screw head 150 and the screw nut 152 may be too high because of the large frictional counter forces. In particular, in the locking screw mechanism of the prior art of FIG. 6, the contact area 160 is relatively large leading to a relatively high frictional force between the screw nut 152 and the magazine 12 as the screw nut 152 is dethreaded about the screw shaft 154.

Referring to FIG. 1, when the force required to loosen the locking screw mechanism is too high, an operator during the manufacture of integrated circuits cannot easily release t he magazine 12 from the plurality of locking screw mechanisms 14, 16, 18, and 20. With such a high force requirement, the operator's hands may feel too sore in repeatedly attempting to release the magazine 12 from the plurality of locking screw mechanisms 14, 16, 18, and 20 as a large number of integrated circuit packages are manufactured during a day.

The strips 22, 24, and 26 of integrated circuit packages need to be transported from one processing site to another processing site during the manufacture of the integrated circuit packages. After processing of the strips 22, 24, and 26 of integrated circuit packages on the magazine 12 at one processing site, the magazine with the strips 22, 24, and 26 of integrated circuit packages should be released from the plurality of locking screw mechanisms 14, 16, 18, and 20 to be transported to the next processing site.

However, when the force required to loosen the locking screw mechanisms is too high, the operator is compelled to leave the magazine in place and to move the strips 22, 24, and 26 of integrated circuit packages from a magazine that remains clamped by a plurality of locking screw mechanisms at one processing site to another magazine that remains clamped by the plurality of locking screw mechanisms at the next processing site to avoid loosening the locking screw mechanisms for releasing the magazine.

Unfortunately, referring to FIGS. 2 an 3, when the strips of integrated circuit packages are handled by the operator, the delicate leads of the integrated circuit packages tend to be bent. Time is wasted in transferring the plurality of strips of integrated circuit packages from one magazine to another magazine and in fixing the undesirably bent leads of the integrated circuit packages. Thus, a locking screw mechanism is desired that requires minimized force for loosening the locking screw mechanism when an object such as the magazine 12 is clamped therein.

SUMMARY OF THE INVENTION

Accordingly, in a general aspect of the present invention, a locking screw mechanism includes an improved screw nut for minimizing the force required for loosening the locking screw mechanism when an object is clamped therein.

In one embodiment of the present invention, a locking screw mechanism includes a screw shaft and a screw head. The screw head is disposed on the screw shaft and has a first contact surface. A screw nut is threaded about the screw shaft and has a second contact surface. An object is disposed between the screw head and the screw nut. The screw nut is threaded about the screw shaft toward the object such that the object is clamped between a portion of the first contact surface of the screw head and a portion of the second contact surface of the screw nut. The screw nut includes a back screw nut threaded about the screw shaft, and the back screw nut has a nut holding portion and a contact ring surface.

The screw nut also includes a front screw nut disposed around the nut holding portion of the back screw nut. The front screw nut is disposed toward the object that is being clamped, and the front screw nut has the second contact surface that is clamped against the object. The screw nut further includes a holding ring disposed around the nut holding portion of the back screw nut for holding the front screw nut to the back screw nut. The contact ring surface of the back screw nut turns against the front screw nut to press the portion of the second contact surface of the front screw nut against the object when the back screw nut is threaded toward the object.

In addition, the front screw nut is stationary, and the contact ring surface of the back screw nut turns against the front screw nut when the back screw nut is dethreaded away from the object to loosen the screw nut from the clamped object. The contact ring surface has a smaller area than the portion of the second contact surface of the front screw nut that contacts the clamped object to minimize frictional force from the contact ring surface turning against the front screw nut such that a force required for dethreading the back screw nut away from the clamped object is minimized. The front screw nut is moved away from the object with the back screw nut as the holding ring holds the front screw nut to the back screw nut when the screw nut has been sufficiently loosened from the object.

In another aspect of the present invention, the force required for dethreading the back screw nut away from the clamped object is further minimized by reducing the radius and the pitch of the screw shaft.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, and 10 refer to elements having similar structure and function.

DETAILED DESCRIPTION

Figure 1:
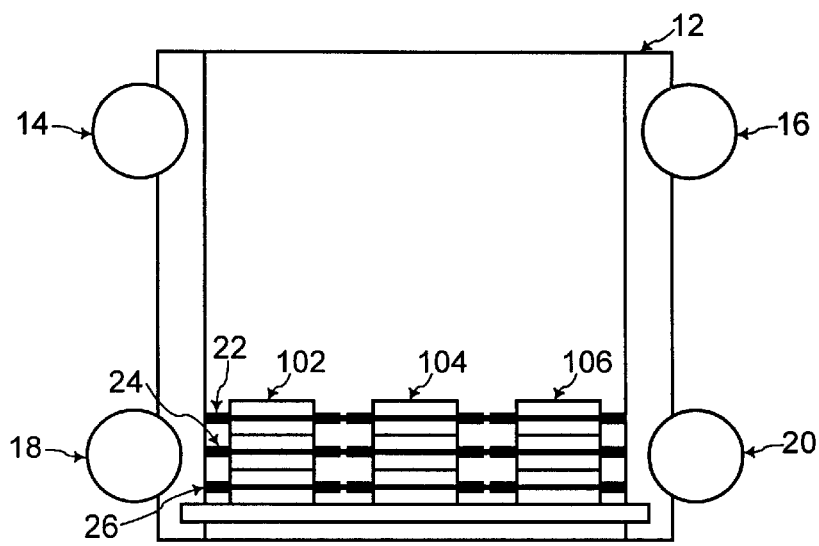
FIG. 1 shows a top view of a magazine being clamped by a plurality of locking screw mechanisms.
Figure 2:
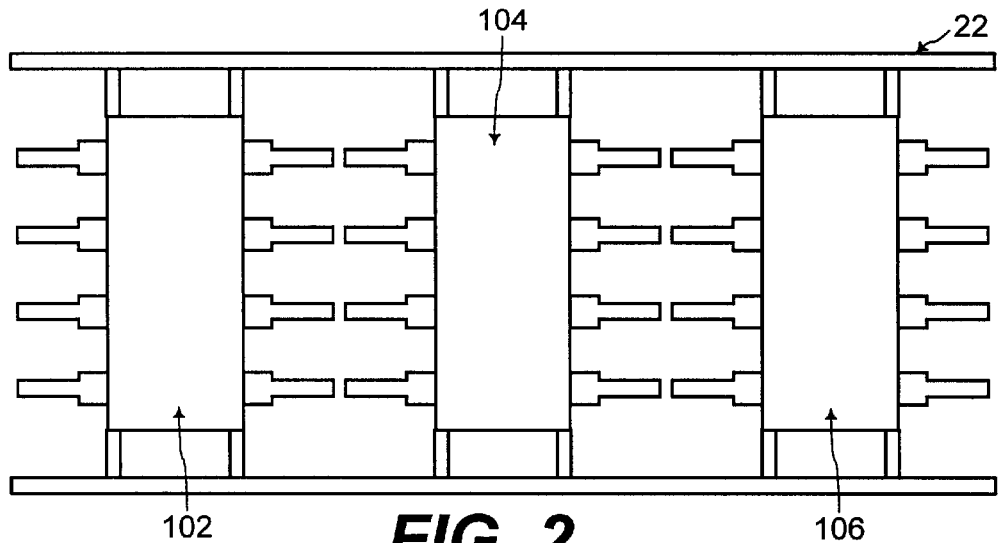
FIG. 2 shows an example strip of integrated circuit packages that is held by the magazine of FIG. 1 during manufacture of the integrated circuit packages.
Figure 3:
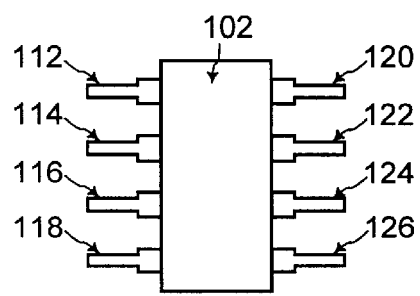
FIG. 3 shows an example integrated circuit package in the strip of FIG. 2 with the integrated circuit package having a plurality of leads.
Figure 4:
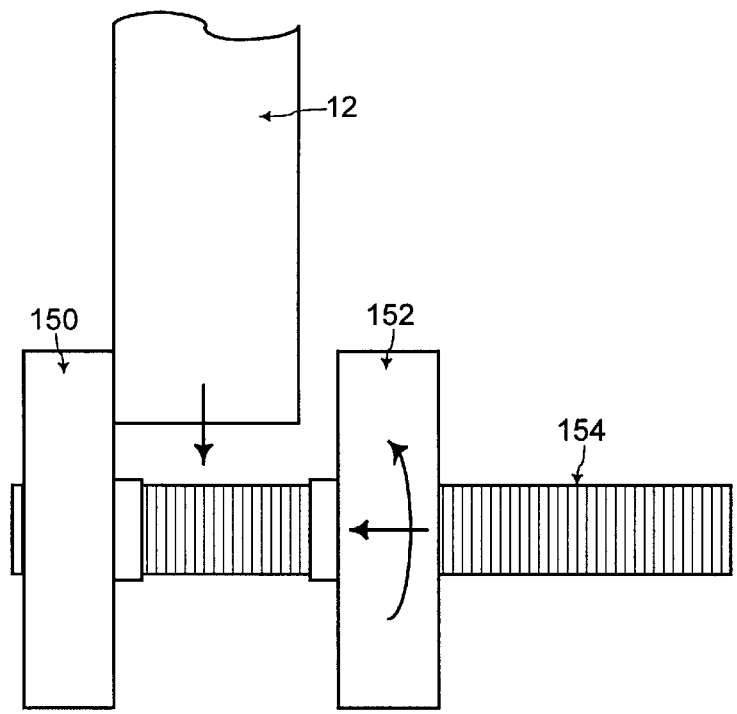
FIG. 4 shows a side view of a locking screw mechanism of the prior art, when the magazine is not yet clamped.
Figure 5:
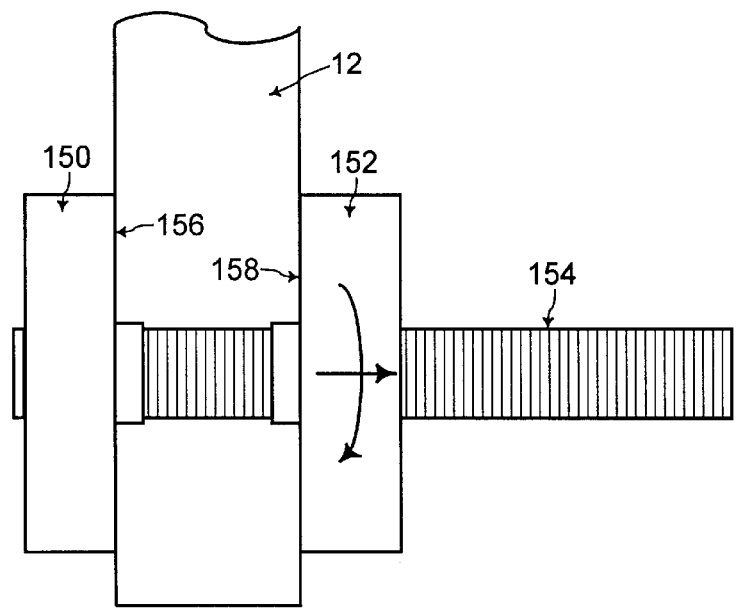
FIG. 5 shows the side view of the locking screw mechanism of the prior art of FIG. 4, when the magazine is clamped.
Figure 7:
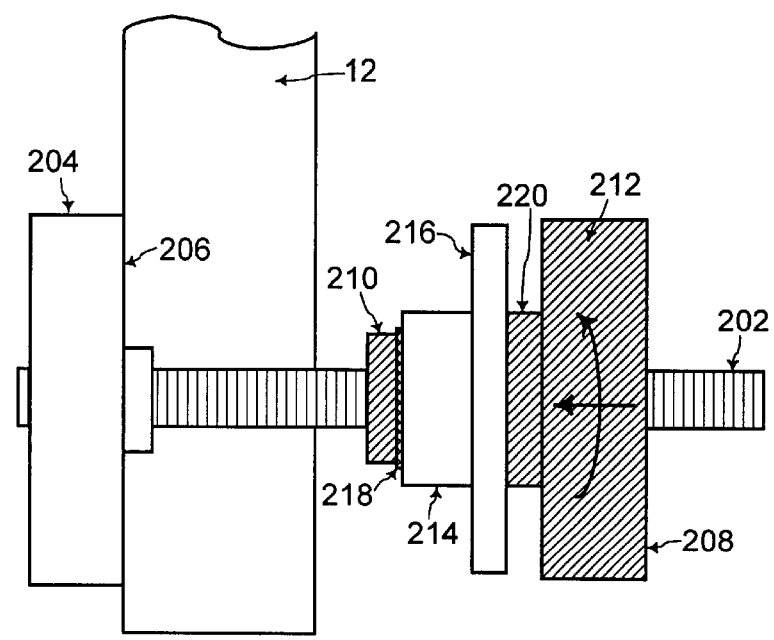
FIG. 7 shows a side view of a locking screw mechanism having a modified screw nut with a front screw nut and a back screw nut for minimizing the force required for loosening the locking screw mechanism when an object is clamped therein, according to an aspect of the present invention, when the magazine is not yet clamped.

Referring to FIG. 7, in a general aspect of the present invention, a locking screw mechanism includes an improved screw nut for minimizing the force required for loosening the locking screw mechanism when an object such as the magazine 12 is clamped therein. The locking screw mechanism of the present invention includes a screw shaft 202 and a screw head 204 disposed on the screw shaft 202. The screw head 204 may be threaded about the screw shaft 202, and the screw head 204 has a first contact surface 206. Referring to FIGS. 1 and 7, a portion of the first contact surface 206 contacts the magazine 12 when the magazine 12 is clamped between the screw head 204 and the screw nut of an aspect of the present invention.

Figure 8:
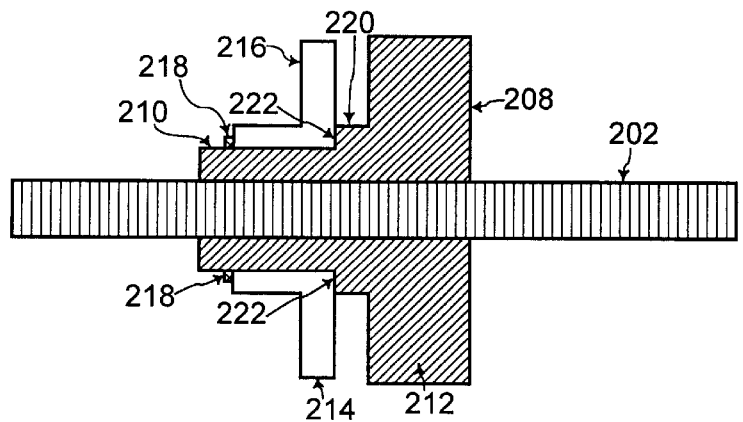
FIG. 8 shows a cross-sectional view of the locking screw mechanism of FIG. 7, according to an aspect of the present invention.

Referring to FIGS. 7 and 8, the screw nut of an aspect of the present invention includes a back screw nut 208 (shown by the hatched shading in FIGS. 7 and 8) threaded about the screw shaft 202. The back screw nut 208 includes a nut holding portion 210 and a turn latching portion 212. Referring to FIGS. 7 and 8, a front screw nut 214 is disposed around the nut holding portion 210 of the back screw nut 208. The front screw nut 214 is disposed toward the magazine 12 and has a second contact surface 216. Referring to FIGS. 1, 7, and 8, a portion of the second contact surface 216 of the front screw nut 214 makes contact with the magazine 12 when the magazine is clamped between the screw head 204 and the screw nut of the present invention.

Further referring to FIGS. 7 and 8, the screw nut of the present invention also includes a holding ring 218 disposed around the nut holding portion 210 of the back screw nut for holding the front screw nut 214 to the back screw nut 208. The back screw nut has a bilevel 220 for forming a contact ring surface 222. The back screw nut 208 presses against the front screw nut 214 at the contact ring surface 222.

Figure 9:
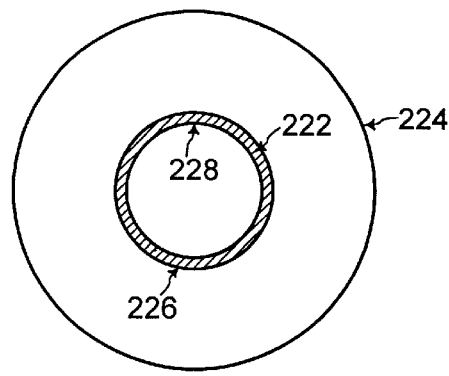
FIG. 9 illustrates the minimized contact area between the front screw nut and the back screw nut for minimizing the force required for loosening the locking screw mechanism, according to an aspect of the present invention.

Referring to FIG. 9, the contact ring surface 222 is illustrated by the shaded area. In FIG. 9, a first circle 224 represents the perimeter of the turn latching portion 212 of the back screw nut 208. A second circle 226 represents the perimeter of the bilevel 220 of the back screw nut 208. A third circle 228 represents the perimeter of the nut holding portion 210 of the back screw nut 208. The contact ring surface 222 is the shaded area between the perimeter 226 of the bilevel 220 and the perimeter 228 of the nut holding portion 210 in FIG. 9.

Figure 10:
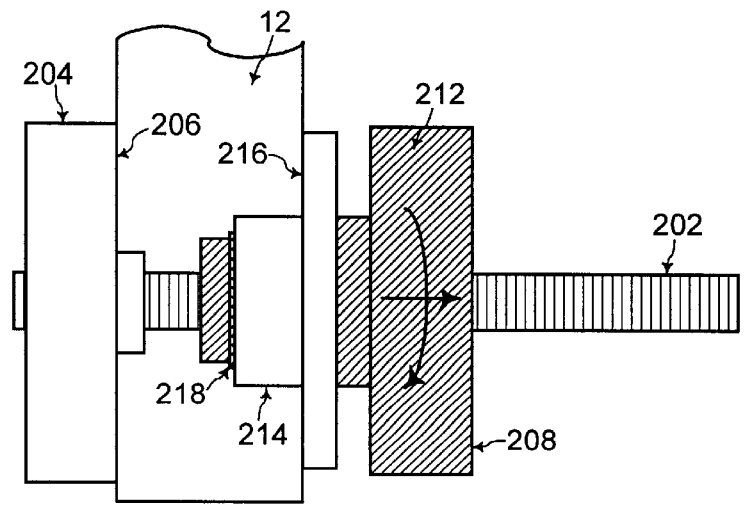
FIG. 10 shows the side view of the locking screw mechanism of FIGS. 7 and 8, when the magazine is clamped.

The operation of the locking screw mechanism according to an aspect of the present invention is now described in reference to FIGS. 7, 8, 9, and 10. Referring to FIGS. 7 and 8, when the magazine 12 is to be clamped in the locking screw mechanism, the magazine 12 is placed between the screw head 204 and the front screw nut 214. The back screw nut 208 is then threaded about the screw shaft 202 toward the magazine 12 (in accordance with the right hand rule as known to one of ordinary skill in the art of mechanics). The contact ring surface 222 of the back screw nut 208 presses the front screw nut 214 toward the magazine 12 until the second contact surface 216 of the front screw nut 214 is pressed against the magazine 12 as shown in FIG. 10.

As the second contact surface 216 of the front screw nut 214 is pressed against the magazine 12, the front screw nut 214 becomes stationary and a portion of the second contact surface 216 of the front screw nut 214 fixedly contacts the magazine 12 as illustrated in FIG. 1. In that case, the contact ring surface 222 of the back screw nut 208 turns against the front screw nut as the back screw nut 208 is threaded toward the magazine 12. At this point, the magazine 12 is clamped between a portion of the first contact surface 206 of the screw head 204 and a portion of the second contact surface 216 of the front screw nut 214 as illustrated in FIG. 1.

While the magazine 12 is clamped, the integrated circuit packages held by the magazine 12 are further processed during manufacture of the integrated circuit packages. For example, the magazine 12 may be clamped by the locking screw mechanism in a solder plating machine such that the leads of the integrated circuit packages may be plated with solder. After such processing of the integrated circuit packages held by the magazine 12, the clamped magazine is released by loosening the locking screw mechanism.

Referring to FIGS. 8, 9, and 10, for loosening the locking screw mechanism, the back screw nut 208 is dethreaded about the screw shaft 202 away from the magazine 12 (in accordance with the right hand rule as known to one of ordinary skill in the art of mechanics). Initially, the magazine 12 is clamped between the first contact surface 206 of the screw head 204 and the second contact surface 216 of the front screw nut 214, and the front screw nut 214 is stationary as the back screw nut 208 is initially dethreaded about the screw shaft 202. As the front screw nut 214 is initially stationary, the contact ring surface 222 of the back screw nut 208 turns against the front screw nut 214 when the back screw nut 208 is initially dethreaded about the screw shaft 202 to loosen the screw nut from the clamped magazine 12.

The force required to turn the back screw nut 208 for initially dethreading the back screw nut 208 away from the clamped magazine 12 (i.e., while the magazine 12 is clamped between the screw head 204 and the front screw nut 214) is determined predominantly by two counter-forces. A first counter-force is the frictional force between the contact ring surface 222 of the back screw nut 208 and the front screw nut 214.

Figure 6:
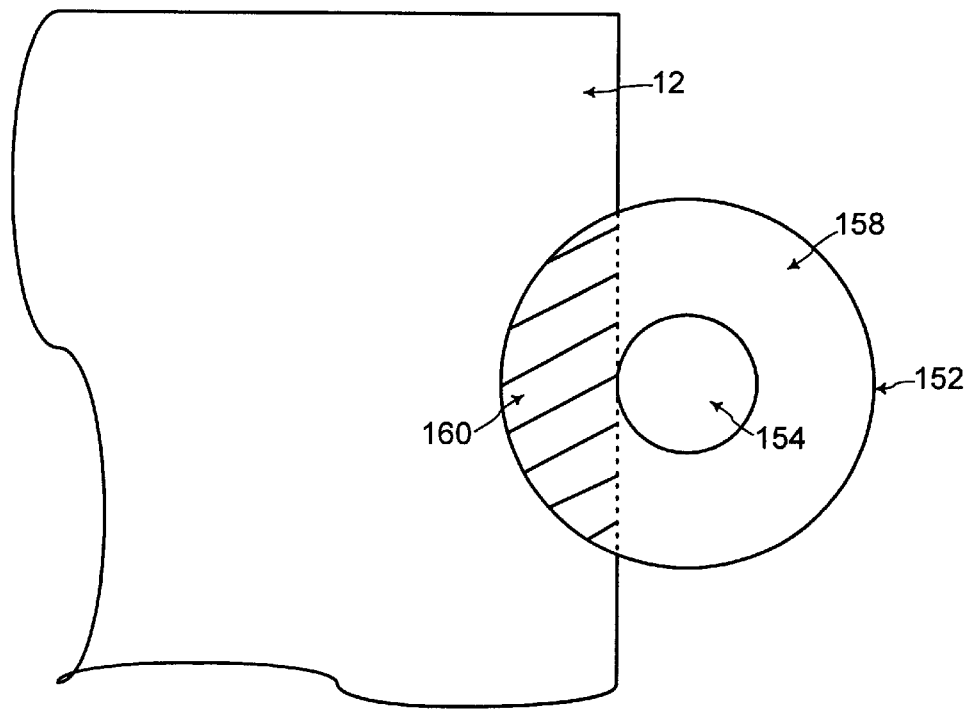
FIG. 6 illustrates the contact area between the magazine and the screw nut of the locking screw mechanism of the prior art of FIGS. 4 and 5 when the magazine is clamped.

Comparing FIGS. 6 and 9, the contact ring surface 222 has a relatively smaller area than the portion of the second contact surface 216 of the front screw nut 214 that contacts the magazine 12. With the locking screw mechanism of the present invention, the front screw nut 214 may remain stationary with respect to the magazine 12 when the back screw nut 208 is initially dethreaded for loosening the locking screw mechanism. The contact ring surface 222 of the back screw nut 208 turns against the stationary front screw nut 214 when the back screw nut 208 is initially dethreaded away from the magazine 12 for loosening the locking screw mechanism. Referring to FIG. 9, the contact ring surface 222 is designed to have a relatively smaller area than the portion of the second contact surface 216 of the front screw nut 214 that contacts the magazine 12 such that the frictional force generated from the contact ring surface 222 of the back nut 208 turning against the stationary front screw nut 214 is minimized. With such minimized frictional force, the force required to dethreaded the back screw nut 208 away from the clamped magazine for loosening the locking screw mechanism is consequently minimized.

A second counter-force that determines the force required for turning the back screw nut 208 for initially dethreading the back screw nut 208 away from the clamped magazine 12 is the frictional force between the threading of the screw shaft 202 and the threading within the back screw nut 208.

For minimizing such frictional force, the radius of the screw shaft 202 is minimized within design constraints for consequently minimizing the force required to dethreaded the back screw nut 208 away from the clamped magazine 12. Such design constraints may depend on the size of the screw shaft 202 that fits within an apparatus of a particular application as would be apparent to one of ordinary skill in the art of mechanics. For example, for clamping the magazine 12 within a solder plating machine, the radius of the screw shaft may be minimized from 25 mm (millimeters) to 11 mm (millimeters).

For further minimizing the frictional force between the threading of the screw shaft 202 and the threading within the back screw nut 208, the pitch of the screw shaft 202 is further minimized. The pitch of the screw shaft 202 is the distance that the back screw nut 208 travels along the axis of the screw shaft 202 when the back screw nut 208 is turned one full round (i.e., 360°) about the screw shaft 202. A smaller pitch of the screw shaft 202 lowers the frictional force between the threading of the screw shaft 202 and the threading within the back screw nut 208 consequently minimizing the force required to dethreaded the back screw nut 208 away from the clamped magazine 12.

In addition, for further minimizing the force required to dethreaded the back screw nut 208 away from the clamped magazine 12, the radius of the turn latching portion 212 of the back screw nut 208 is maximized within design constraints. Such design constraints may depend on the size of the turn latching portion 212 that fits within an apparatus of a particular application as would be apparent to one of ordinary skill in the art of mechanics. For example, for clamping the magazine 12 within a solder plating machine, the radius of the turn latching portion 212 may be maximized to 29 mm (millimeters). For dethreading the back screw nut 208 about the screw shaft 202, an operator holds and rotates the turn latching portion 212 of the back screw nut 208. A larger radius of the turn latching portion 212 minimizes the force required to dethreaded the back screw nut 208 away from the clamped magazine 12.

Referring to FIGS. 8 and 10, once the back screw nut 208 has been sufficiently dethreaded away from the magazine 12, the second contact surface 216 of the front screw nut 214 no longer presses against the magazine 12. In that case, the locking screw mechanism has been loosened, and the front screw nut 214 is moved away from the magazine with the back screw nut as the holding ring 218 holds the front screw nut 214 to the back screw nut 208.

In this manner, the force required for loosening the locking screw mechanism from the clamped magazine 12 is minimized. Thus, during manufacture of integrated circuits, the operator may more easily release the magazine 12 holding a plurality of integrated circuits for transferring the magazine from one processing site to the next processing site. Thus, the operator is not compelled to manually transfer the plurality of strips of integrated circuit packages from a clamped magazine at one processing site to another clamped magazine at the next processing site thereby avoiding bent leads on the integrated circuit packages.

The foregoing is by way of example only and is not intended to be limiting. For example, the locking screw mechanism of the present invention is described for locking a magazine that holds strips of integrated circuit packages in a solder plating machine during manufacture of integrated circuit packages. However, the locking screw mechanism of the present invention may advantageously be used for locking any other object in place, as would be apparent to one of ordinary skill in the art from the present description herein.

The present invention is limited only as defined in the following claims and equivalents thereof.

We claim:

1. A locking screw mechanism comprising:
   a screw shaft;
   a screw head disposed on said screw shaft, said screw head having a first contact surface; and
   a screw nut threaded about said screw shaft, said screw nut having a second contact surface, wherein an object is disposed between said screw head and said screw nut, and wherein said screw nut is threaded about said screw shaft toward said object such that said object is clamped between a portion of said first contact surface of said screw head and a portion of said second contact surface of said screw nut, said screw nut further comprising:
      aback screw nut threaded about said screw shaft, said back screw nut having a nut holding portion, and said back screw nut having a contact ring surface;
      a front screw nut disposed around said nut holding portion of said back screw nut, said front screw nut being disposed toward said object that is being clamped and said front screw nut having said second contact surface that is clamped against said object, wherein said second contact surface of said front screw nut is exposed toward said screw head when said object is not disposed between said screw head and said screw nut; and
      a holding ring disposed around said nut holding portion of said back screw nut for holding said front screw nut to said back screw nut, wherein said holding ring is not disposed between said second contact surface of said front screw nut and said object when said second contact surface is clamped against said object;
      and wherein said contact ring surface of said back screw nut turns against said front screw nut to press said portion of said second contact surface of said front screw nut against said object when said back screw nut is threaded toward said object;
      and wherein said front screw nut is stationary and said contact ring surface of said back screw nut turns against said front screw nut when said back screw nut is dethreaded away from said object to loosen said screw nut from said clamped object;
      and wherein said contact ring surface has a smaller area than said portion of said second contact surface of said front screw nut that contacts said clamped object to minimize frictional force from said contact ring surface turning against said front screw nut such that a force required for dethreading said back screw nut away from said clamped object is minimized;
      and wherein said front screw nut is moved away from said object with said back screw nut as said holding ring holds said front screw nut to said back screw nut when said screw nut has been sufficiently loosened from said object.

2. The locking screw mechanism of claim 1, wherein said back screw nut further includes a turn latching portion that is rotated by an operator for dethreading said back screw nut about said screw shaft.

3. The locking screw mechanism of claim 2, wherein said radius of said turn latching portion is approximately 29 millimeters.

4. The locking screw mechanism of claim 1, wherein a radius of said screw shaft is approximately 11 millimeters.

5. The locking screw mechanism of claim 1, wherein said screw head is threaded about said screw shaft.

6. The locking screw mechanism of claim 1, wherein said object is a magazine for holding strips of integrated circuit packages during a process of solder plating a plurality of leads of said integrated circuit packages.

7. A locking screw mechanism comprising:

a screw shaft;

a screw head disposed on said screw shaft, said screw head having a first contact surface; and a screw nut threaded about said screw shaft, said screw nut having a second contact surface, wherein an object is disposed between said screw head and said screw nut, and wherein said screw nut is threaded about said screw shaft toward said object such that said object is clamped between a portion of said first contact surface of said screw head and a portion of said second contact surface of said screw nut, said screw nut further comprising:

a back screw nut threaded about said screw shaft, said back screw nut having a nut holding portion, and said back screw nut having a contact ring surface;

a front screw nut disposed around said nut holding portion of said back screw nut, said front screw nut being disposed toward said object that is being clamped and said front screw nut having said second contact surface that is clamped against said object, wherein said second contact surface of said front screw nut is exposed toward said screw head when said object is not disposed between said screw head and said screw nut; and a holding ring disposed around said nut holding portion of said back screw nut for holding said front screw nut to said back screw nut, wherein said holding ring is not disposed between said second contact surface of said front screw nut and said object when said second contact surface is clamped against said object;

and wherein said contact ring surface of said back screw nut turns against said front screw nut to press said portion of second contact surface of said front screw nut against said object when said back screw nut is threaded toward said object;

and wherein said front screw nut is stationary and said contact ring surface of said back screw nut turns against said front screw nut when said back screw nut is dethreaded away from said object to loosen said screw nut from said clamped object;

and wherein said contact ring surface has a smaller area than said portion of said second contact surface of said front screw nut that contacts said clamped object to minimize frictional force from said contact ring surface turning against said front screw nut such that a force required for dethreading said back screw nut away from said clamped object is minimized;

and wherein said front screw nut is moved away from said object with said back screw nut as said holding ring holds said front screw nut to said back screw nut when said screw nut has been sufficiently loosened from said object;

and wherein said back screw nut further includes a turn latching portion that is rotated by an operator for dethreading said back screw nut about said screw shaft.

* * * * *